(12) United States Patent
Himsl et al.

(10) Patent No.: US 6,360,441 B1
(45) Date of Patent: Mar. 26, 2002

(54) BUMPER BEAM ASSEMBLY AND METHOD

(75) Inventors: Walter Himsl, Hanover, PA (US); Jeffrey J. Mellis, Sterling Heights, MI (US)

(73) Assignee: Cosma International Inc., Aurora (CA)

( * ) Notice: Subject to any disclaimer, the term of this patent is extended or adjusted under 35 U.S.C. 154(b) by 0 days.

(21) Appl. No.: 09/396,412

(22) Filed: Sep. 15, 1999

Related U.S. Application Data
(60) Provisional application No. 60/100,835, filed on Sep. 18, 1998.

(51) Int. Cl.$^7$ .......................... B21D 53/88; B60R 19/02
(52) U.S. Cl. ...................... 29/897.2; 293/102; 293/122; 72/369
(58) Field of Search .......................... 29/897.35, 897.2, 29/DIG. 37; 293/102, 130, 122, 120; 72/372, 369, 166, 52, 168, 335, 342.1

(56) References Cited

U.S. PATENT DOCUMENTS

| | | | |
|---|---|---|---|
| 4,408,790 A | * 10/1983 | Shimoda et al. | 293/122 |
| 5,080,427 A | 1/1992 | Sturrus et al. | 296/188 |
| 5,092,512 A | 3/1992 | Sturrus et al. | 228/146 |
| 5,104,026 A | 4/1992 | Sturrus et al. | 228/17.5 |
| 5,305,625 A | * 4/1994 | Heinz | 72/132 |
| 5,306,058 A | 4/1994 | Sturrus et al. | 293/154 |
| 5,340,177 A | 8/1994 | Maxam | 293/102 |
| 5,395,036 A | 3/1995 | Sturrus | 228/146 |
| 5,454,504 A | 10/1995 | Sturrus | 228/17 |
| 5,545,022 A | 8/1996 | Rosasco | 425/110 |
| 5,566,874 A | 10/1996 | Sturrus | 228/17 |
| 5,722,708 A | * 3/1998 | Jonsson | 293/102 |
| 5,813,594 A | 9/1998 | Sturrus | 228/146 |
| 5,934,544 A | * 8/1999 | Lee et al. | 72/168 |
| 5,997,058 A | * 12/1999 | Pedersen | 293/102 |
| 6,032,504 A | * 3/2000 | Onat et al. | 72/297 |

FOREIGN PATENT DOCUMENTS

| | | |
|---|---|---|
| FR | 2 392 850 | 2/1979 |
| WO | WO95/20506 | 8/1995 |

OTHER PUBLICATIONS

T.E. Fine et al.; Society of Automotive Engineers; Feb. 24–281975; "Development of Lightweight Door Intrusion Beams Utilizing an Ultra High Strength Steel".
International Search Report re: PCT/CA99/00842.

\* cited by examiner

*Primary Examiner*—S. Thomas Hughes
*Assistant Examiner*—Marc Jimenez
(74) *Attorney, Agent, or Firm*—Pillsbury Winthrop LLP

(57) ABSTRACT

The present invention relates to improved methods for manufacturing bumper beam assemblies and bumper beam assemblies made by such methods. One method of the invention allows bumper beams of different longitudinal configurations to be made by selecting open cross-sectioned, roll-formed bumper beam members from different sets of beam members and fixing them to bumper beam mounting structures. The mounting structures close off the open cross-section of the bumper beam members. Another method of the invention allows bumper beams for varying applications to be made by selecting bumper beam members from inventory and fixing them to a bumper beam mounting structure.

12 Claims, 9 Drawing Sheets

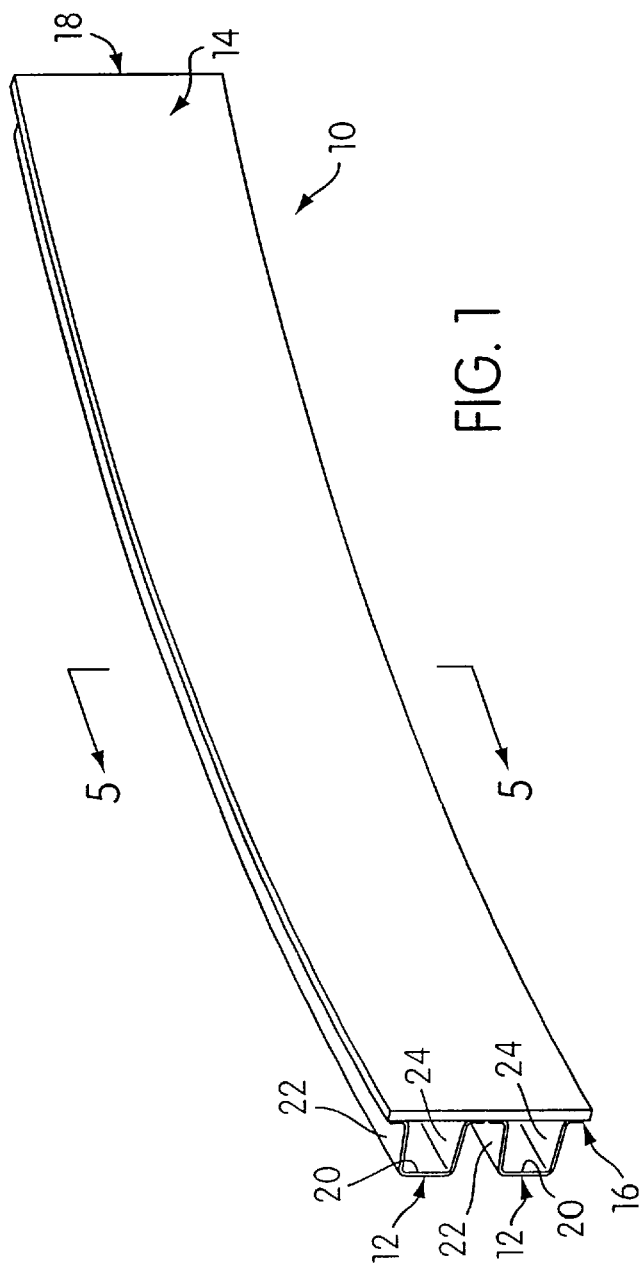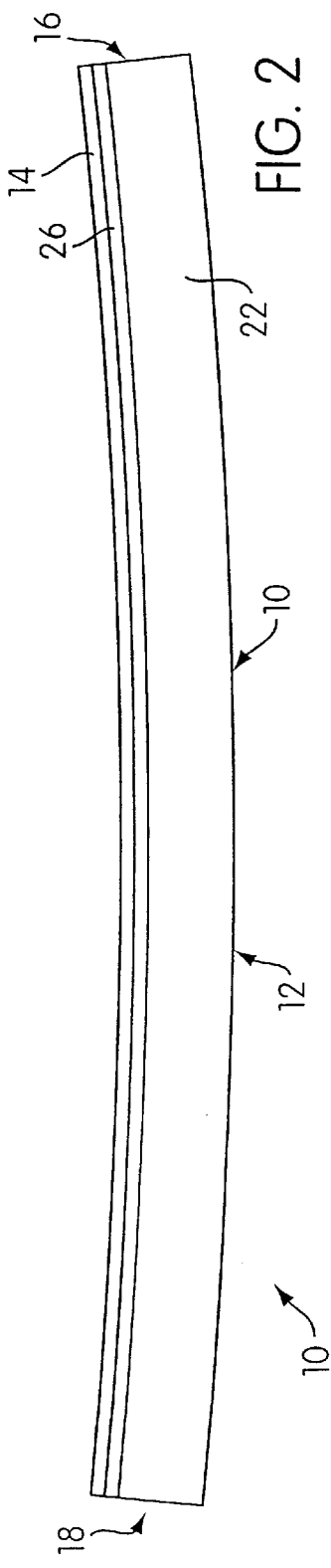

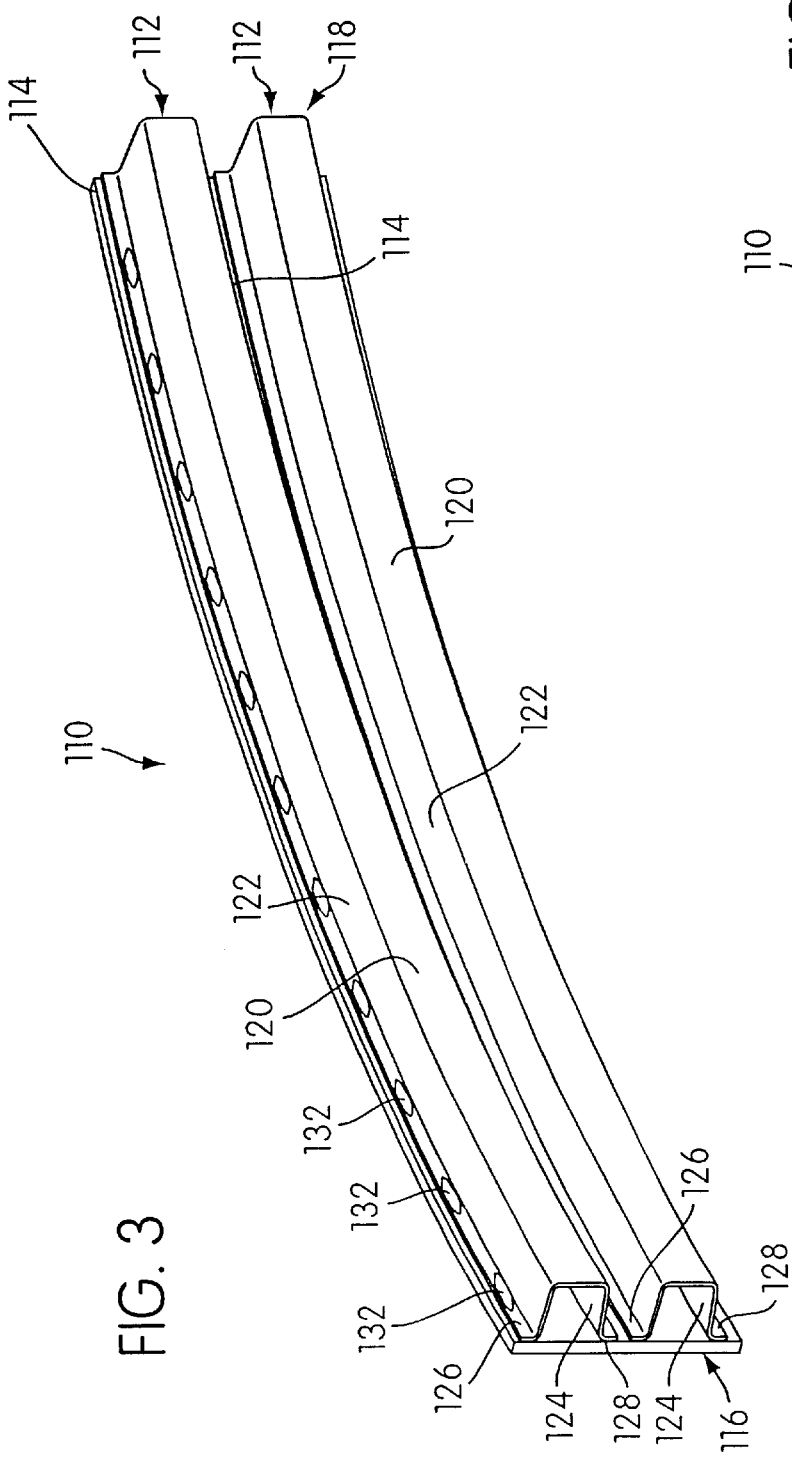
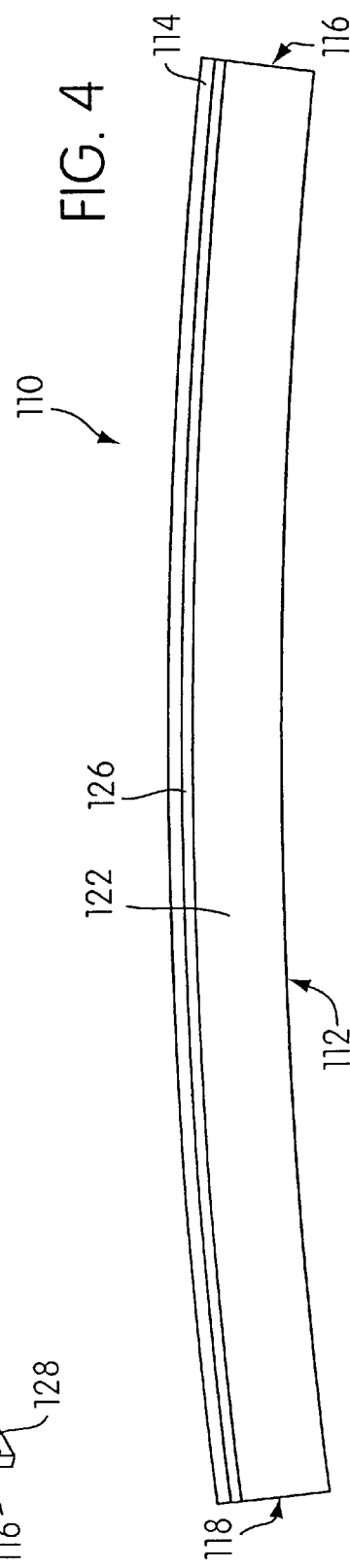

BUMPER BEAM ASSEMBLY AND METHOD

The present application claims priority to U.S. Provisional Appln. of Himsl et al., Serial No. 60/100,835, filed Sep. 18, 1998, the entirety of which is hereby incorporated into the present application by reference.

FIELD OF THE INVENTION

The present invention relates to bumper beam assemblies and methods for making the same.

BACKGROUND OF THE INVENTION

Open cross-section and closed cross-section bumpers for conventional motor vehicles are known in the prior art. It is also known that either type of bumper can be made by roll-forming or by stamping. Closed cross-section bumpers of a straight configuration can be formed by roll-forming a continuous sheet of metal so that the longitudinal edges thereof abut each other and then seam welding these edges, or by stamping two "clam-shell" halves having a C-shaped cross section and seam welding the halves together.

Each type of bumper is frequently also provided with an arcuate curvature in the longitudinal direction. Often this longitudinal curvature, sometimes referred to as the "sweep," is imparted to the metal by passing the same through a series of mandrels following a roll-forming operation.

Conventional open cross-section bumpers are disadvantageous in that such bumpers offer less resistance to deformation during impact for a given metal gauge and thickness than a closed cross-section bumper. Conventional open cross-section bumpers are often strengthened by increasing the metal thickness, which results in an undesirable increase in weight and materials cost.

However, open cross-section bumpers are typically easier to manufacture than closed cross-section bumpers. For example, it is easier to roll form and bend an open cross-section bumper to provide for bumper sweep, even when a relatively high tensile strength steel is used to construct the bumper. That is, it is relatively more difficult to provide a straight roll-formed closed cross-section bumper with sweep, because bending a closed cross-section beam tends to cause the metal material to buckle. Consequently there exists a need in the art for a bumper beam assembly that provides the impact strength of a closed section beam without the difficulties typically associated with providing a desired curvature or sweep to the closed section beam.

It is also known in the motor vehicle industry that different vehicles have different strength and size requirements for their associated bumper beams. Conventionally, different tooling would be required to manufacture the different beams for each particular application. However, providing different toolings for each particular application is very expensive and occupies manufacturing space that could be utilized for other purposes. Consequently, there exists a need in the art for method by which a plurality of different bumper beams can be made using a limited set of toolings.

SUMMARY OF THE INVENTION

It is an object of the present invention to meet the needs described above. To achieve this object, the present invention provides a modular bumper beam assembly and a method for manufacturing the same which solves many of the above-described technical problems. The bumper beam assembly in accordance with the present invention is formed by: roll forming from sheet metal a plurality of substantially identical elongated bumper beam members each having a generally opened cross-sectional configuration including one opened side, the plurality of bumper beam members including a first set of bumper beam members having a first longitudinal configuration and a second set of bumper beam members having a second longitudinal configuration different from the first longitudinal configuration; stamping from sheet metal a plurality of elongated, generally planar bumper beam mounting structures, and fixing a selected number of bumper beam members from one of the first and second sets of bumper beam members on a selected mounting structure within the plurality of mounting structures such that the selected mounting structure closes the one opened side of each of the selected number of bumper beam members.

In accordance with another aspect of the present invention, there is provided a method of forming a plurality of bumper beam assemblies for accommodating different applications. The method comprises roll forming from sheet metal a plurality of elongated bumper beam members each having a generally identical longitudinal configuration to form an inventory of elongated bumper beam members; stamping from sheet metal a plurality of elongated, generally planar bumper beam mounting structures; selecting a first number of the bumper beam members from the inventory; fixing the first number of bumper beam members to a selected one of the bumper beam mounting structures to form a first bumper beam assembly; selecting a second number of bumper beam members different from the first number; and fixing the second number of bumper beam members to another selected one of the bumper beam mounting structures to form a second bumper beam assembly different from the first bumper beam assembly.

As described in detail hereinbelow, this manufacturing method offers numerous advantages. The bumper beam member is provided with an open cross-section during the roll-forming process, and thus it is easier to bend the bumper beam member longitudinally in order to provide the desired degree of arcuate curvature, or sweep, in comparison to bending a structure with a closed cross-section.

The closed section is formed from two parts, and therefore higher strength steel can be used to construct the bumper beam member in comparison with the mounting structure portion of the closed section.

In a preferred embodiment, the bumper beam members can be nested to provide increased bumper strength.

In accordance with another feature of the present invention, bumper beam mounting structures can also be constructed in different sizes to accommodate a selected number of bumper beam members.

In accordance with another feature of the present invention, bumper beam mounting structures may be secured together prior to fixing the bumper beam members thereto in order to form larger bumper beam assemblies.

Also in accordance with the invention, a plurality of identical bumper beam members and bumper beam mounting structures can be easily stored and maintained in an inventory to construct a wide range of bumper beam assemblies as needed.

Other objects, features, and advantages of the present invention will become apparent from the following detailed description, the accompanying drawings, and the appended claims.

BRIEF DESCRIPTION OF THE DRAWINGS

FIG. 1 is an isolated perspective view of a bumper beam assembly with an inside sweep constructed according to the principles of the present invention;

FIG. 2 is a top plan view of the bumper beam assembly of FIG. 1;

FIG. 3 is an isolated perspective view of a bumper beam assembly with an outside sweep constructed according to the principles of the present invention;

FIG. 4 is a top plan view of the bumper beam assembly of FIG. 3;

DETAILED DESCRIPTION OF THE PREFERRED EMBODIMENT OF THE INVENTION

Figure 5:
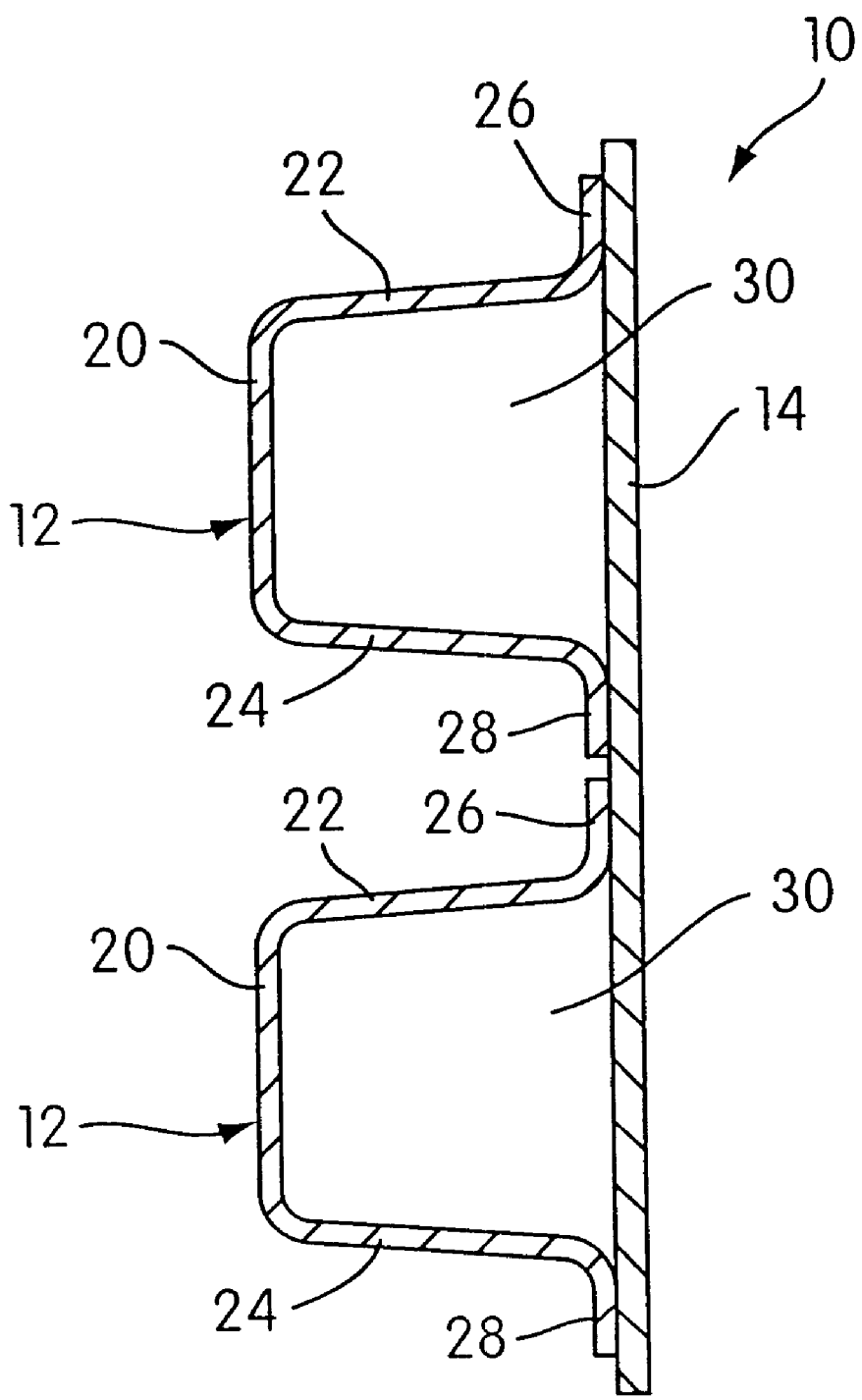
FIG. 5 is cross-sectional view of the bumper beam assembly taken along the line 5—5 in FIG. 1.

FIG. 1 shows a motor vehicle bumper beam assembly 10 constructed according to the principles of the present invention. The bumper beam assembly 10 comprises at least one bumper beam member, generally designated 12, affixed to a bumper beam mounting structure, generally designated 14. The bumper beam assembly 10 is an elongated structure and preferably has a longitudinal configuration having a slight degree of longitudinal curvature, or "sweep", from a first end 16 thereof to a second end 18 thereof.

The bumper beam assembly 10 can be provided with an inside sweep as shown in FIGS. 1–2, with an outside sweep as shown in the bumper beam assembly 110 of FIGS. 3–4, or can have a substantially straight (not shown) longitudinal configuration, depending on the application. A cross-sectional view of the bumper beam assembly 10 of FIG. 1 is shown in FIG. 5. It should be appreciated that a cross-section taken through a beam of an opposite longitudinal curvature as in the embodiment of FIG. 3, or of a straight longitudinal configuration would be substantially identical.

The bumper beam assemblies 10 and 110 shown in FIGS. 1–5 each include two bumper beam members 12, 112 (respectively) rigidly fixed on the bumper beam mounting structures 114.

Referring to FIG. 5, it can be appreciated that each bumper beam member 12 is an integral structure that has a central wall portion 20 and an upper and a lower wall portion, 22 and 24, respectively. The upper and lower wall portions 22, 24 terminate respectively in an upper flange portion 26 and a lower flange portion 28. The C-shaped, open cross-sectional configuration of each beam member 12 includes one opened side designated 30.

The bumper beam members 12 and the bumper beam mounting structure 14 are preferably made of steel. It is contemplated to use metals having a variety of tensile strengths and thicknesses, but it is preferred to use ultra high strength steel having a KSI value of between about 100 and 220 to form the bumper beam members 12 and to use a milder steel having a KSI value of between about 28 and 50 to form the bumper beam mounting structure 14. The milder steel used for the bumper beam mounting structure in accordance with the invention facilitates bending of the mounting structure to accommodate a particular bumper beam curvature if one is desired.

The bumper beam members 12 can be affixed to the bumper beam mounting structure 14 by any suitable means, but the preferred method is welding. A series of puddle welds are shown in the embodiment of FIG. 3 designated by the reference numeral 132.

Figure 6:
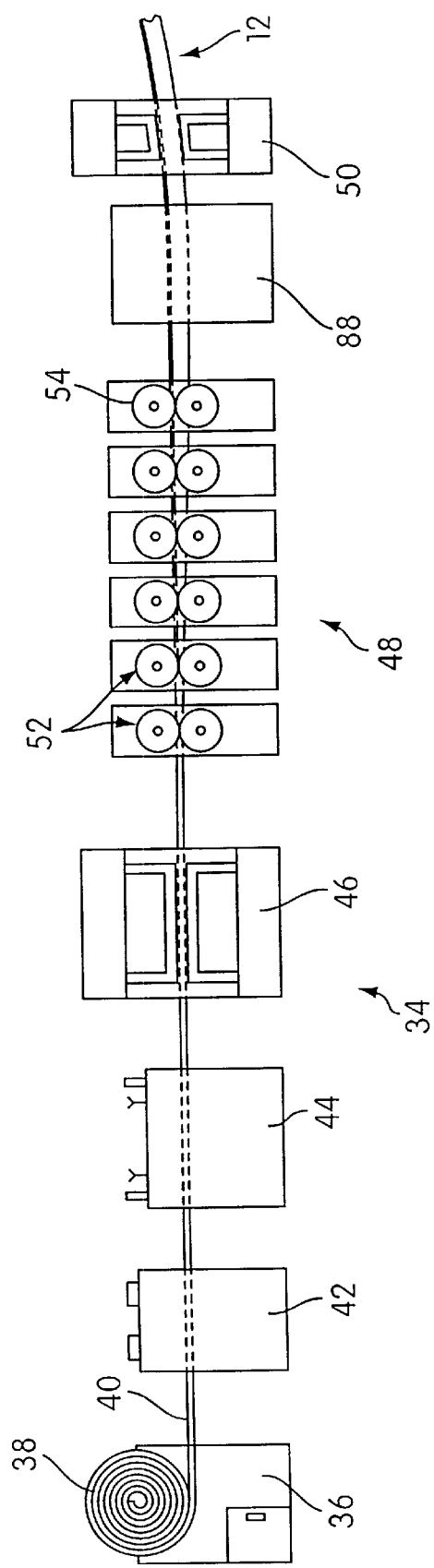
FIG. 6 is a schematic side plan view of a rolling apparatus for constructing the bumper beam members of the present invention.

The bumper beam members 12 can be roll-formed from rolls of raw sheet metal material, preferably steel, in a conventional rolling apparatus. A rolling apparatus for forming the bumper beam members 12 of the present invention is shown schematically in FIG. 6 and is generally designated by the reference numeral 34. The rolling apparatus 34 generally includes an uncoiling station 36 for uncoiling large strips or sheets of coiled raw metal material 38. The coiled metal material 38 is uncoiled so that a flat sheet of material 40 is fed sequentially through a plurality of metal forming devices including a temper mill 42, a stock straightener 44, an optional pre-pierce press 46, a conventional rolling mill 48 and a cutoff press 50. The rolling mill 48 includes several pairs of cooperating heavy metal rollers, generally designated 52. A last set of rollers 52 may comprise a conventional twisting station (not shown) which straightens out any twists in the roll-formed section during formation.

The temper mill 42 provides cold metal reduction prior to the rolling process. This increases the strength of the metal and simultaneously reduces the metal thickness (e.g., by about five percent) to increase the strength to weight ratio of the bumper beam members 12 enabling the same to be formed within closer tolerances. The stock straightener 42 flattens the metal sheet to remove any imperfections or inconsistencies in the metal.

The optional pre-piercing press 46 can punch holes in the bumper beam members 12 as may be required to secure other structures. After the sheet metal is roll-formed to have an open, generally C-shaped cross-section and then provided with the desired degree of longitudinal sweep, a predetermined length of the rolled material is cut by the cutoff press 50 to form the individual bumpers.

In the preferred embodiment discussed above, the bumper beam sweep is provided by the roll forming operation itself. In an alternate preferred embodiment, the bumper beam is rolled into a substantially straight configuration and then subsequently bent in a bending station. The latter, alternate embodiment may be advantageous in that it allows a large stock of straight beams to be roll-formed and then later bent to meet particular applications as they arise. On the other hand, roll forming the bumper beam with sweep is a more economical and efficient process.

Figure 7:
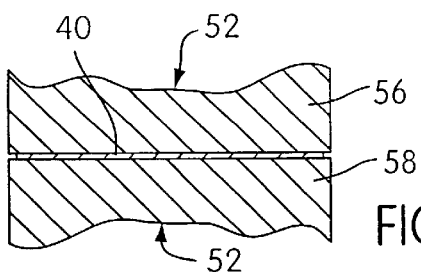
FIGS. 7–13 are fragmentary cross-sectional views of an exemplary series of paired rollers configured for roll forming bumper beam members according to the present invention.
Figure 8:
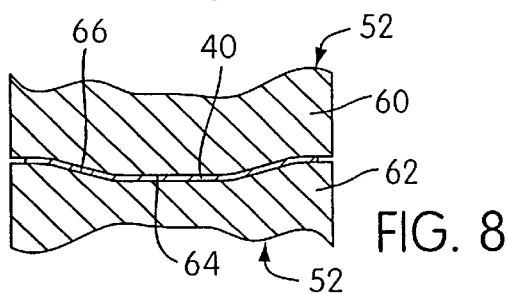
Figure 9:
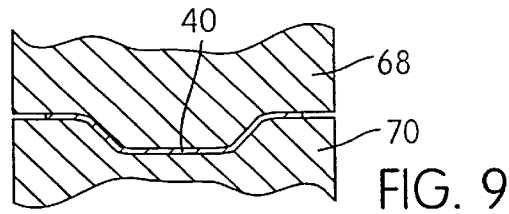
Figure 10:
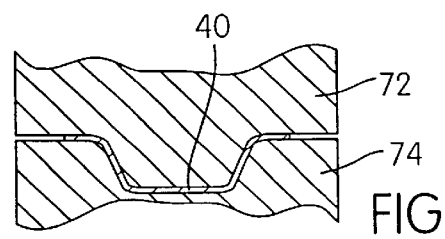
Figure 11:
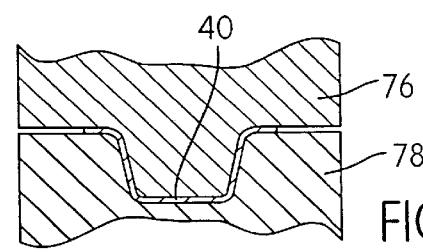
Figure 12:
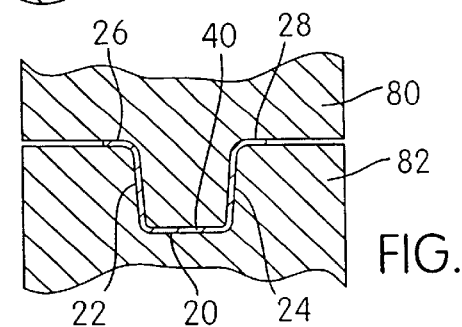

FIGS. 7–12 show in fragmentary cross-sectional view successive pairs of metal rollers 52 used within the rolling mill 48 to form the C-shaped cross-section of the bumper beam members 12. FIG. 7 shows in fragmentary sectional view a first pair of rollers 56 and 58 for initially flattening the sheet of raw material 40 in order to remove any imperfections or inconsistencies in the sheet. The first shaping operation is performed with paired rollers 60 and 62 as shown in FIG. 8. As can be appreciated from FIG. 8, the engaging surface 64 of the roller 60 has a slightly convex cross-section and the engaging surface 66 of the complimentary roller 62 is slightly concave. These surfaces 64, 66 compress the sheet of material 40 therebetween, thereby slightly bending the material as it passes through the rolling mill.

Figure 13:
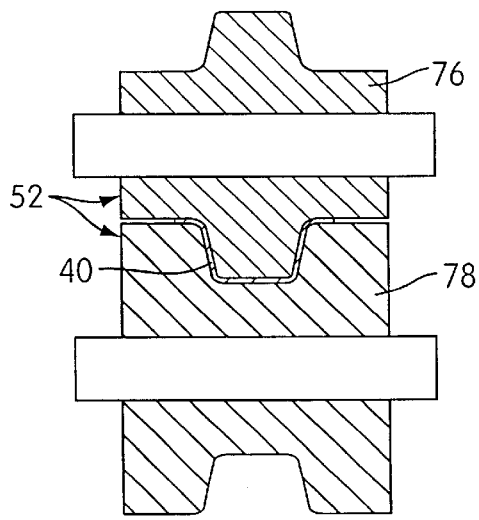

In addition to shaping the sheet of steel 40, the rolling engagement of each pair of rollers in the rolling mill also feeds the sheet 40 to the next pair of rollers. It can be appreciated from FIGS. 9–12 that the cooperating pairs of rollers 68 and 70, 72 and 74, 76 and 78, and 80 and 82 progressively bend the sheet of steel material 40 to form the upper and lower wall portions 22, 24 and form the upper and lower support portions 26, 28 on the respective edges of the upper and lower wall portions 22, 24 (shown in FIG. 5). FIG. 13 shows a full sectional view of rollers 76 and 78 for further illustrative purposes.

It can appreciated that the rolling mill 48 in FIGS. 6–13 and the sweep apparatus 88 are configured to provide bumper beam members 12 having an inside sweep as shown, for example, in FIGS. 1 and 2. It can also be appreciated that each pair of rollers can be reversed and the sweep apparatus 88 appropriately reconfigured to provide bumper beam members having an outside sweep or a straight sweep.

The roll-forming procedure is advantageous over stamping because an entire roll of metal material 38 can be processed in continuous fashion without the need to move bumper beam members 12 to and from a stamping station or between a plurality of stamping stations. In addition, because roll-forming is a gradual process in which a sheet of metal is bent incrementally to form the C-shaped cross-section of each bumper beam member 12, roll-formed beam members are more accurately formed than would be the case if they were formed by stamping. Stamping can also result in undesirable wrinkling of the metal bumper members.

The bumper beam mounting structure 14 is preferably formed by stamping into essentially planar elongated sections of predetermined dimensions. As will be explained hereinbelow, it is contemplated to stamp a plurality of bumper beam mounting structures 14 having different heights so that bumper beam assemblies of a wide range of sizes can easily be constructed.

Referring to the bumper beam assembly 10 illustrated in FIGS. 1, 2 and 5 by way of example, it can be appreciated that the bumper beam assembly in accordance with the present invention is generally formed by mounting a preselected number of bumper beam members 12 on a selected bumper beam mounting structure 14. The bumper beam mounting structure 14 is substantially straight and planar prior to being fixed to the bumper beam members 12 and can be bent while it is being fixed. Specifically, the mounting structure 14 is preferably affixed to the bumper beam member 12 by welding and is bent progressively as it is welded onto the bumper beam member. It can be appreciated that the lower tensile strength of the bumper beam mounting structure 14 facilitates bending thereof as it is fixed to the bumper beam member 12.

The bumper beam members 12, 112 and the mounting structures 14 and 114 are modular in nature in that a small inventory thereof can be maintained and assembled as needed to produce bumper beam assemblies 10, 110 of different sizes, sweeps and strengths. An exemplary modular bumper assembly inventory can be comprised of a plurality of bumper beam members of two cross-sectional sizes; and a plurality of bumper beam mounting structures of identical lengths but different vertical heights. More specifically, each bumper beam mounting structure has a length preferably equal to the length of each bumper beam member. The bumper beam mounting structures can have a range of vertical heights, however, to accommodate bumper beam members of different sizes, to accommodate a plurality of vertically spaced bumper beam members, and/or to accommodate such plurality of vertically spaced bumper beam members with a variety of spacing configurations to accommodate different applications with the same inventory.

FIGS. 5, 14, 15, and 16 illustrate a plurality of bumper beam assemblies, which can be constructed from a small exemplary inventory. FIG. 5, for instance, shows in cross-section an example of a bumper beam assembly 10 which can be constructed from a single bumper beam mounting structure 14 and two bumper beam members 12. The cross-section in FIG. 5 shows the vertical height of the mounting structure 14, but the longitudinal extent thereof is not shown.

It should be appreciated that the same beam members 12 can be used for different applications by altering the vertical spacing therebetween. In this regard, the mounting structure 14 may be provided with an increased vertical height to accommodate a greater range of vertical spacing variations between beam members 12 for different applications. In addition to enabling variable spacing between beam members, an increased mounting structure height also lends to having a different number of beam members being mounted. For example, an increased vertical height mounting plate in comparison with mounting plate 14 in FIG. 5 may accommodate three or more open section beams mounted thereon. On the other hand, a decreased vertical height for the mounting plate may better accommodate a single open section beam.

Figure 14:
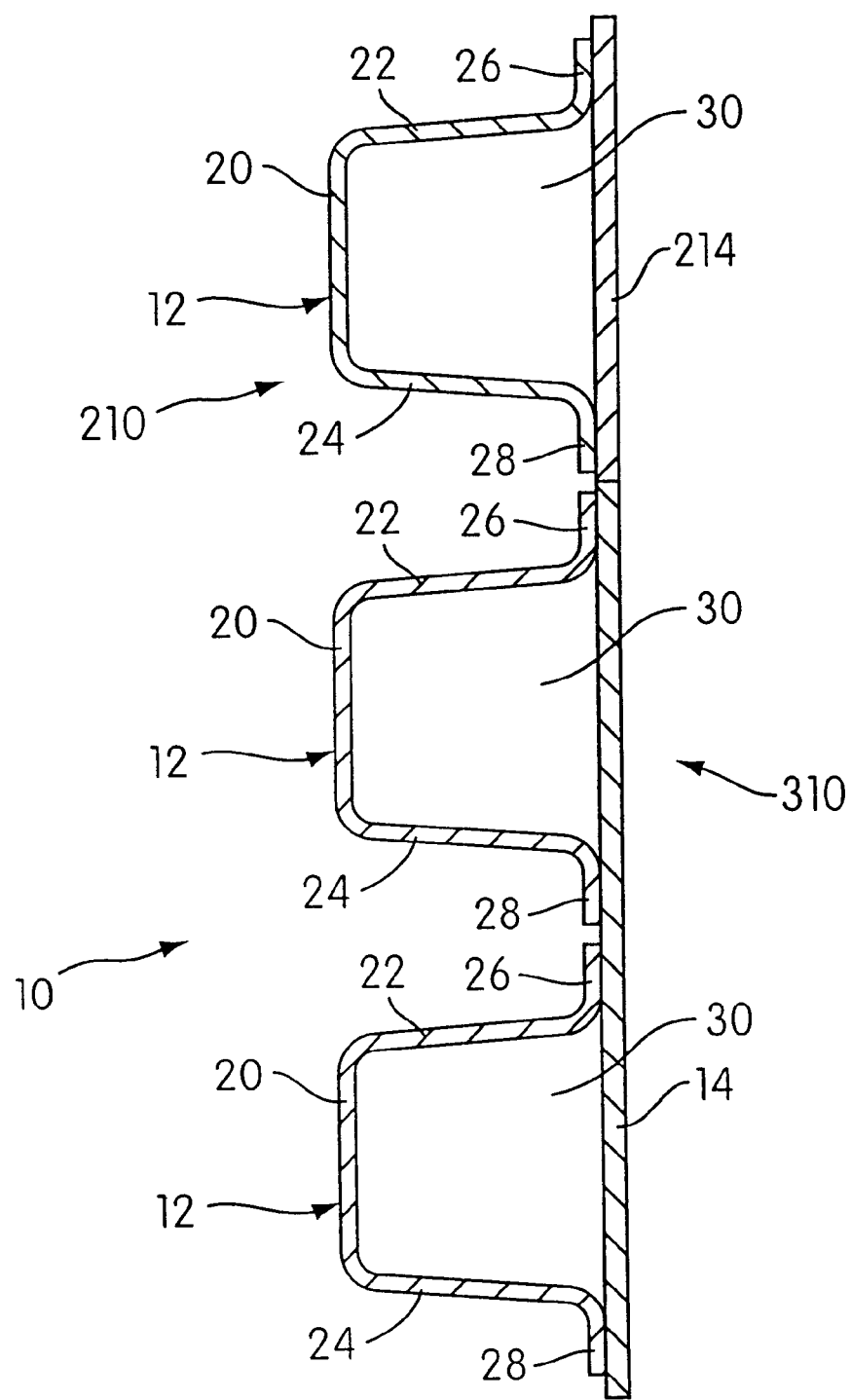
FIG. 14 is a cross-sectional view of a bumper beam assembly in accordance with another embodiment of the present invention.

FIG. 14 shows that two bumper beam mounting assemblies 10 and 210, each of which can be used as bumper beam assembly in and of itself for particular application, can be combined by being secured to one another to form a larger bumper beam assembly 310 for yet even another application. The assemblies 10 and 210 can be secured together to increase the size range of the bumper beam assemblies that can be produced from a given inventory of identical bumper beam members 12 and different sized beam mounting structures 14 and 214. In the exemplary embodiment shown in FIG. 14, the bumper beam mounting structure 214 accommodating only a single beam 12 is weldedly fixed to the bumper beam mounting structure 14 (as was illustrated in FIGS. 1, 2 and 5) to form a bumper beam mounting structure with a vertical height equal to the sum of the vertical heights of 14 and 214 and sufficient to receive the three bumper beam members 12. The bumper beam mounting structures 14 and 214 are preferably secured together by welding longitudinal edges thereof in a first manufacturing step to produce the bumper beam mounting structure of increased vertical height, and this combined mounting structure is then used to mount the plurality of bumper beam members 12 in a second step.

Figure 15:
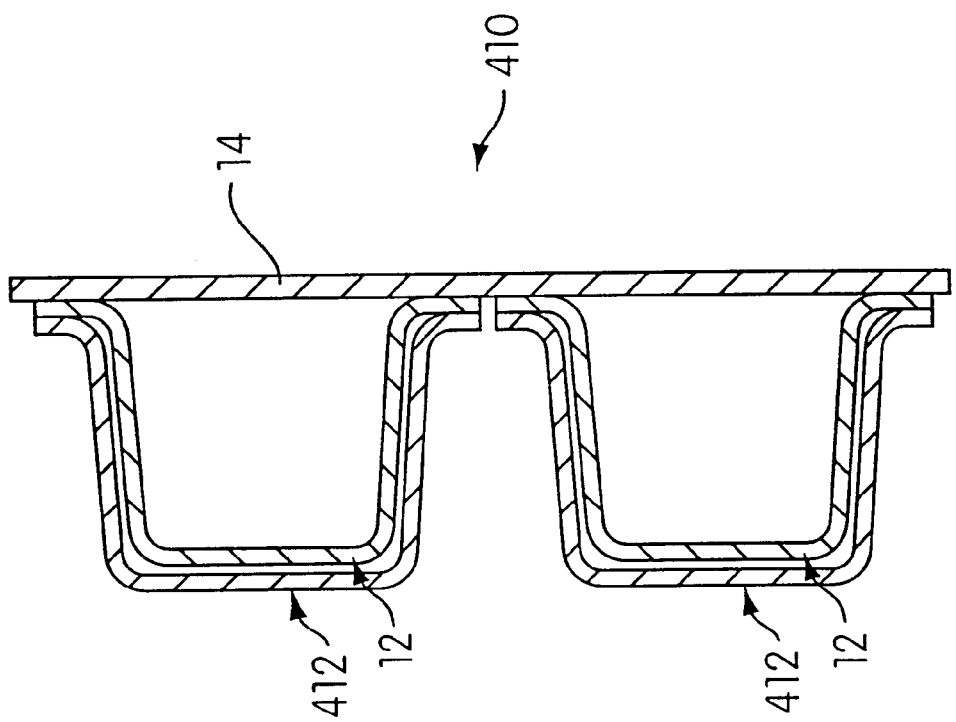
FIG. 15 is a cross-section view of a bumper beam assembly in accordance with yet another embodiment of the present invention in which a plurality of bumper beam members have been nested to reinforce the assembly.

FIG. 15 shows that a plurality of bumper beam members (designated 412 and 12) that differ only in cross-section can be nested to form a reinforced or high strength bumper beam assembly 410. Specifically, the cross-section of the beam member 12 is slightly smaller than that of beam member 412 so that beam 12 can be nested within bumper beam 412 as shown to increase the impact resistance and strength of the assembly 410.

A basic principle behind the present invention is that a plurality of bumper beam members, which may include members with different sweeps and cross-sectional sizes, and a plurality of generally planar bumper beam mounting structures differing only in vertical height can comprise a modular bumper system to provide a plurality of bumper beam assemblies having a wide range of sizes, configurations, strengths and sweeps to accommodate a wide range of vehicle designs and bumper applications.

The approach to bumper design and construction made possible by the aforedescribed bumper beam members and bumper beam mounting structures provides many advantages. The figures show that each bumper beam member has an open cross-section but that the bumper beam member (or members if more than one is used) and the bumper beam mounting structure cooperate to provide the bumper beam assembly with a closed cross-section. Because each bumper beam,member has an open cross-section during the roll-forming process, it is easier to provide each bumper beam member 12, 12d with the desired degree of inside or outside sweep. It is easily understood that when the bumper beam mounting structure is secured by welding to each bumper beam member in the associated bumper beam assembly, the opened side 30 of each bumper beam member is closed to increase the strength of the assembly for a given type, strength and thickness of metal.

It can be understood that in the broader aspects of the invention, it is contemplated to provide a plurality of essentially identical bumper beam members 12 each of which is swept or arcuate in generally the same configuration and that the bumper beam mounting structure is bent during the bumper assembly process to conform to the sweep or generally same arcuate longitudinal configuration of the bumper beam members 12.

Figure 16:
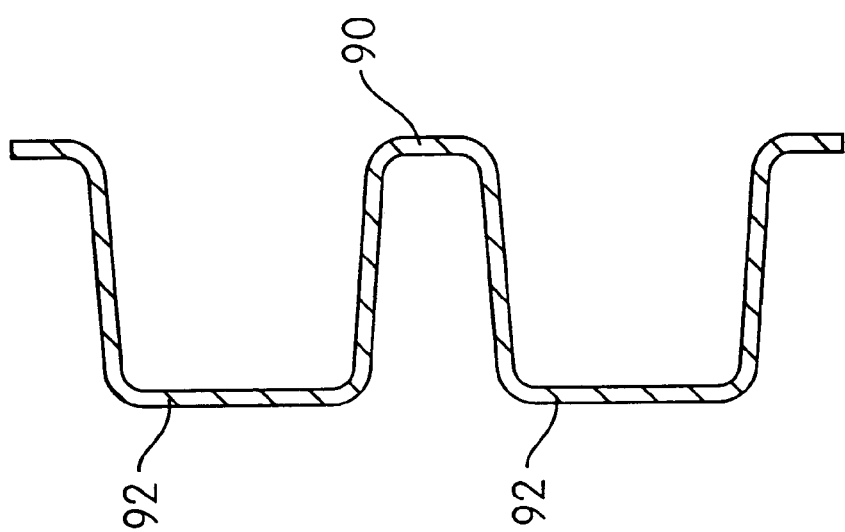
FIG. 16 is a cross sectional view of yet another embodiment of the invention, wherein a bumper beam member has a double C-shaped cross-section.

It can be appreciated that the drawings and forgoing examples are intended to convey broad aspects of the invention and are not intended to be limiting. The dimensions and shapes disclosed herein can be altered within a wide range without departing from the scope of the invention. FIG. 16, for example, shows in cross-section a bumper beam member 90, which was roll-formed to form a plurality of channels or protruding portions 92. This bumper beam member 90 has an essentially double C-shaped cross-section. This member 90 can be swept in either direction and can be mounted on a mounting structure 14 so as to close off the one open side of the beam member 90 in a similar manner described above for a single channel member 12. A plurality of double channel bumper beam members can be nested to form a reinforced assembly. It is also contemplated to reinforce the mounting structure by securing a second mounting structure in overlying relation therewith and it is contemplated to provide a plurality of apertures as needed through the bumper beam members 12, the mounting structure or both, to facilitate the mounting of the bumper beam assembly 10 to the vehicle or the mounting of other structures as, for example, a cover, to the bumper beam assembly 10 when the same is installed on a vehicle. It should also be appreciated that each of the embodiments shown in cross-section in the figures can represent assemblies that are inside swept, outside swept, or straight configurations degrees or straight.

Figure 17:
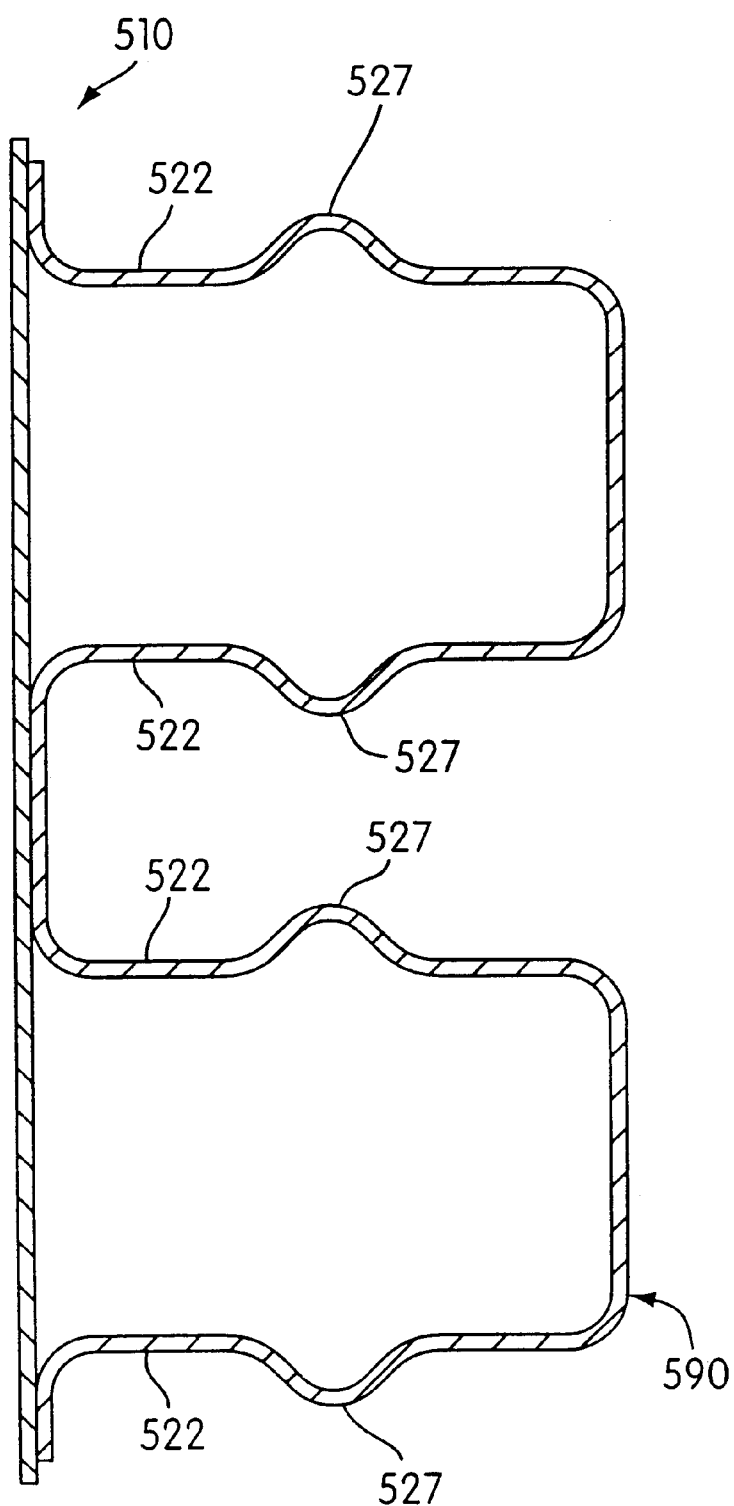
FIG. 17 is a further embodiment of a bumper beam assembly employing a bumper beam member similar to that shown in FIG. 16, but provided with outwardly projecting stiffening beads to improve impact resistance.

Shown in FIG. 17 is a further embodiment of a bumper beam assembly 510 employing a bumper beam member 590 similar to that shown in FIG. 16. In the embodiment of FIG. 17, however, each of the horizontally extending wall portions 522 are provided with outwardly projecting stiffening beads 527 to improve impact resistance of the beam.

Figure 18:
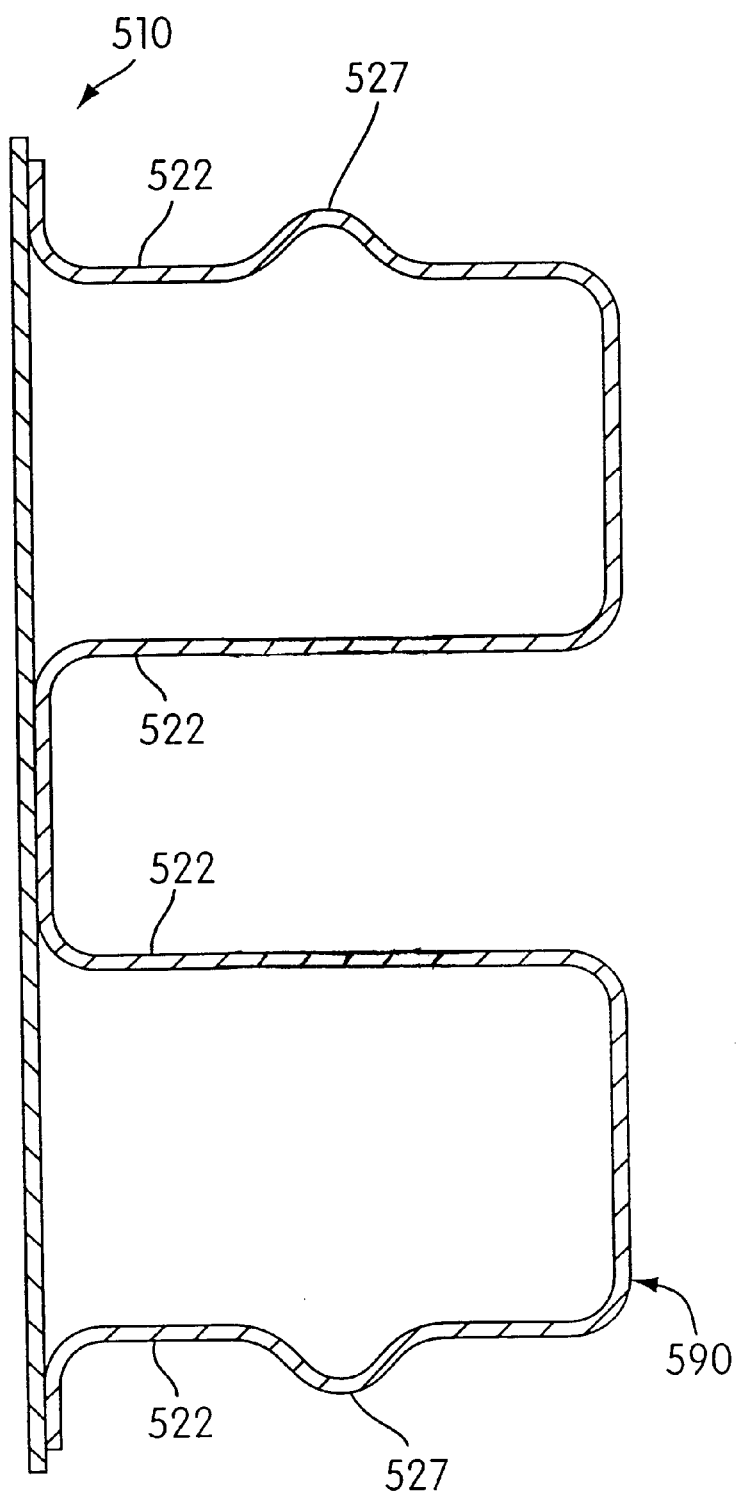
FIG. 18 is a further embodiment similar to that illustrated in FIG. 17, but in which the inner stiffening beads have been removed.

FIG. 18 is a further embodiment similar to that illustrated in FIG. 17, but in which the inner stiffening beads have been removed. This construction makes it much easier to provide the bumper beam assembly with the desired sweep in comparison with the construction of FIG. 17.

While the invention has been disclosed and described with reference to a limited number of embodiments, it will be apparent that variations and modifications may be made therein without departure from the spirit and scope of the invention. Therefore, the following claims are intended to cover all such modifications, variations, and equivalents thereof in accordance with the principles and advantages noted herein.

What is claimed is:

1. A method for forming a plurality of bumper beam assemblies comprising:

roll forming from sheet metal a plurality of elongated bumper beam members having substantially identical cross-sectional configurations including one opened side, said plurality of bumper beam members including at least a first set of bumper beam members having a first longitudinal configuration and a second set of bumper beam members having a second longitudinal configuration different from said first longitudinal configuration, said cross-sectional configurations and said first and second longitudinal configurations being imparted to said first and second bumper beam members, respectively, during said roll forming, providing a plurality of elongated, generally planar bumper beam mounting structures, selecting a number of bumper beam members from one of said first and second sets of bumper beam members;

selecting a bumper beam mounting structure from said plurality of bumper beam mounting structures; and then, fixing said selected number of bumper beam members on said selected mounting structure after said roll forming such that said selected mounting structure closes said one opened side of each of the selected number of bumper beam members.

2. A method according to claim 1, wherein said selected number of bumper beam members are from said first set of bumper beam members, and wherein said first longitudinal configuration of the bumper beam members selected from said first set comprises a longitudinal curvature, said method further comprising:

bending said selected mounting structure to conform to the generally same longitudinal curvature of said selected number of bumper beam members from said first set.

3. A method according to claim 1, wherein providing said plurality of elongated bumper beam mounting structures comprises stamping said plurality of bumper beam mounting structures from metal material.

4. A method according to claim 3, wherein said stamping provides said bumper beam mounting structures with varying heights.

5. A method according to claim 1, wherein said fixing is accomplished by welding.

6. A method according to claim 1, wherein said selected mounting structure comprises a plurality of stamped metal sheets welded to one another.

7. A method according to claim 1, wherein said selected mounting structure comprises a single sheet of stamped sheet metal.

8. A method according to claim 1, wherein said first longitudinal configuration of said bumper beam members selected from said first set comprises a longitudinal curvature having an inside sweep and wherein said second longitudinal configuration of said bumper beam members selected from said second set comprises a longitudinal curvature having an outside sweep, said method further comprising:

bending said selected mounting structure to conform to the generally same longitudinal curvature of said selected number of bumper beam members from said one of said first and second sets of bumper beam members.

9. A method for forming a plurality of bumper beam assemblies for accommodating different applications comprising:

roll forming from sheet metal a plurality of elongated bumper beam members having substantially identical longitudinal configurations and substantially identical cross-sectional configurations to form an inventory of elongated bumper beam members, said longitudinal configurations and said cross-sectional configurations being imparted to said bumper beam members during said roll forming;

stamping from sheet metal a plurality of elongated bumper beam mounting structures;

selecting a first number of said bumper beam members from said inventory;

fixing said first number of bumper beam members to a selected one of said bumper beam mounting structures after said roll forming to form a first bumper beam assembly;

selecting a second number of bumper beam members different from said first number; and then fixing said second number of bumper beam members to another selected one of said bumper beam mounting structures after said roll forming to form a second bumper beam assembly different from said first bumper beam assembly.

10. A method according to claim 9, wherein said first number of bumper beam members is one, and wherein said second number of bumper beam members is two.

11. A method according to claim 9, wherein said first number of bumper beam members comprises two bumper beam members mounted vertically with respect to one another on said selected one of said bumper beam mounting structures.

12. A method according to claim 9, wherein said first number of bumper beam members comprises two bumper beam members nested within one another.

* * * * *